(12) United States Patent
Kao

(10) Patent No.: US 7,677,473 B2
(45) Date of Patent: Mar. 16, 2010

(54) SPOUT FOR FOAMING AND SAVING WATER

(75) Inventor: Yu-Yueh Kao, Taipei (TW)

(73) Assignee: Highplus International Co., Ltd., Taipei (TW)

( * ) Notice: Subject to any disclaimer, the term of this patent is extended or adjusted under 35 U.S.C. 154(b) by 129 days.

(21) Appl. No.: 12/003,565

(22) Filed: Dec. 28, 2007

(65) Prior Publication Data

US 2009/0166450 A1    Jul. 2, 2009

(51) Int. Cl.
*E03C 1/08* (2006.01)
(52) U.S. Cl. .................. 239/428.5; 239/457; 239/541; 239/580; 239/582.1
(58) Field of Classification Search ............. 239/428.5, 239/456–460, 537–541, 579, 580, 581.1–583
See application file for complete search history.

(56) References Cited

U.S. PATENT DOCUMENTS

| | | | | |
|---|---|---|---|---|
| 2,675,218 A | * | 4/1954 | Bletcher et al. | 239/417.5 |
| 2,989,249 A | * | 6/1961 | Richter | 239/427 |
| 3,104,819 A | * | 9/1963 | Aghnides | 239/106 |
| 4,470,546 A | * | 9/1984 | Wildfang | 239/428.5 |
| 4,562,960 A | * | 1/1986 | Marty et al. | 239/72 |
| 5,071,071 A | * | 12/1991 | Chao | 239/428.5 |
| 5,704,397 A | * | 1/1998 | Lu | 137/630.15 |

* cited by examiner

*Primary Examiner*—Christopher S Kim
(74) *Attorney, Agent, or Firm*—Muncy, Geissler, Olds & Lowe, PLLC

(57) ABSTRACT

A spout for foaming and saving water has a shell, a foaming assembly mounted in the shell, a sieving assembly mounted on a faucet end of the foaming assembly and a regulator mounted through the foaming assembly. The foaming assembly has a sleeve, a distributor mounted in the sleeve, a foaming ring mounted between the sleeve and the distributor and an inlet valve mounted on a faucet end of the sleeve. The spout is mounted on an outlet of a faucet to allow water to flow through the sieving assembly and the foaming assembly and mix with air to foam to provide foaming water flowing out of the spout. Impurities in the water do not clog the foam assembly and water flow is regulated with the regulator selectively mounted in a water flow hole of the inlet valve.

20 Claims, 6 Drawing Sheets

SPOUT FOR FOAMING AND SAVING WATER

BACKGROUND OF THE INVENTION

1. Field of the Invention

The present invention relates to a spout, especially to a spout for a faucet causing foaming to save water.

2. Description of the Prior Arts

With reference to FIG. 5, a conventional spout is mounted on an outlet of a faucet, foams and saves water flowing out of the faucet and comprises a shell (60), a foaming assembly (70) and a sieve (80).

The shell (60) is tubular and has a faucet end, an outer surface, an inner surface and a thread. The thread is formed around the outer surface of the shell (60) near the faucet end and may be fastened onto the outlet of the faucet.

The foaming assembly (70) has a sleeve (71), a water flowing net (72), multiple foaming nets (73) and a distributor (74).

The sleeve (71) is tubular, is metal, is securely mounted in the shell (60) and has a sidewall, an abutting rim (711) and multiple elongated holes (710). The sidewall has a faucet end and an outlet end. The abutting rim (711) is larger than, is formed on and protrudes from the faucet end of the sidewall of the sleeve (71) and abuts the inner surface of the shell (60) to maintain a gap between the shell (60) and the sidewall of the sleeve (71). The elongated holes (710) are formed respectively through the sidewall of the sleeve (71).

The water flowing net (72) is mounted in the sleeve (71) near the outlet end of the sidewall of the sleeve (71) and has an upper surface and an interlaced mesh.

The foaming nets (73) are metal, are mounted sequentially in the sleeve (71) adjacent to the upper surface of the water flowing net (72) and each foaming net (73) has an interlace mesh. The interlaced mesh of the foaming net (73) may be tighter than the interlaced mesh of the water flowing net (72).

With further reference to FIG. 6, the distributor (74) is mounted on the faucet end of the sidewall of the sleeve (71) and has a bottom, a lower surface, a faucet end, multiple through holes (741) and a separator (742). The through holes (741) are formed respectively through the bottom of the distributor (74). The separator (742) is formed on and protrudes from the lower surface of the distributor (74) and presses the foaming nets (73) against the water flowing net (72) and maintains space between the distributor (74) and the foaming nets (73). The space between the distributor (74) and the foam nets (73) communicates with the elongated holes (710) of the sleeve (71) and the gap between the sidewall of the sleeve (71) and the shell (60).

The sieve (80) is mounted on the faucet end of the distributor (74).

The water flowing out of the outlet of the faucet flows through the sieve (80) and the through holes (741) of the distributor (74). Air flows through the gap between the shell (60) and the sidewall of the sleeve (71), the elongated holes (710) of the sleeve (71) and into the space between the distributor (74) and the foaming nets (73). The water and the air are mixed with each other and flow through the meshes of the foaming nets (73) and the water flowing net (72) to provide foaming water. The air in the foams raises a volume of the water, thereby increasing a perceived amount of water.

However, though the conventional spout saves water, the meshes of the foaming nets (73) are planar meshes. Impurities, especially dirt, dust and limescale may be carried by the water and jam the meshes of the foaming nets (73). Once jammed, the foaming nets (73) block flow of water and may cause the water to back up and flow out of the elongated holes (710) or, if water pressure is too high, causes rupture or breakage of the spout that must therefore be replaced. Furthermore, the conventional spout cannot regulate water flow.

To overcome the shortcomings, the present invention provides a spout for foaming and saving water to mitigate or obviate the aforementioned problems.

SUMMARY OF THE INVENTION

The main objective of the present invention is to provide a spout for foaming and saving water that has a shell, a foaming assembly mounted in the shell, a sieving assembly mounted on a faucet end of the foaming assembly and a regulator mounted through the foaming assembly.

The foaming assembly has a sleeve, a distributor mounted in the sleeve, a foaming ring mounted between the sleeve and the distributor and an inlet valve mounted on a faucet end of the sleeve.

The spout is mounted on an outlet of a faucet to allow water to flow through the sieving assembly, the inlet valve and the distributor and mix with air to become foam. Then the foaming water flows through the foaming ring and the sleeve and out of the spout. Impurity of the water cannot easily clog the spout, and water flow is regulated with the regulator selectively mounted in a water flow hole of the inlet valve.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
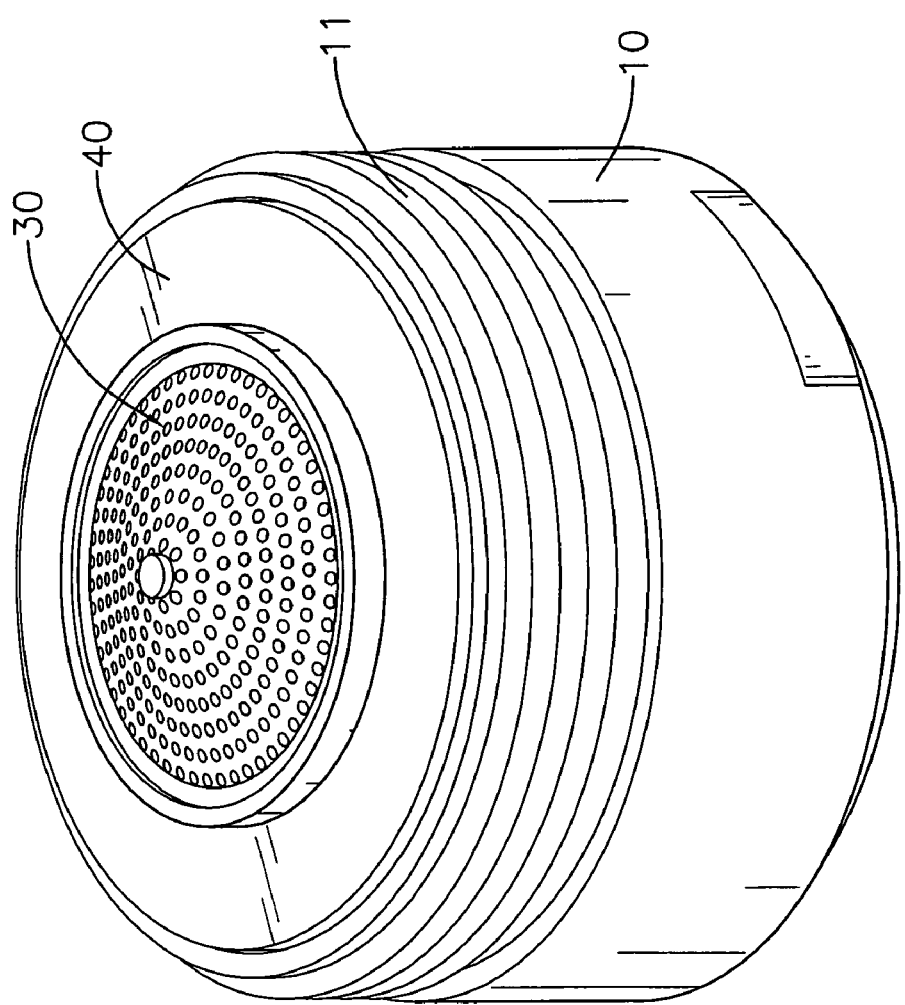
FIG. 1 is a perspective view of a spout for foaming and saving water in accordance with the present invention.
Figure 2:
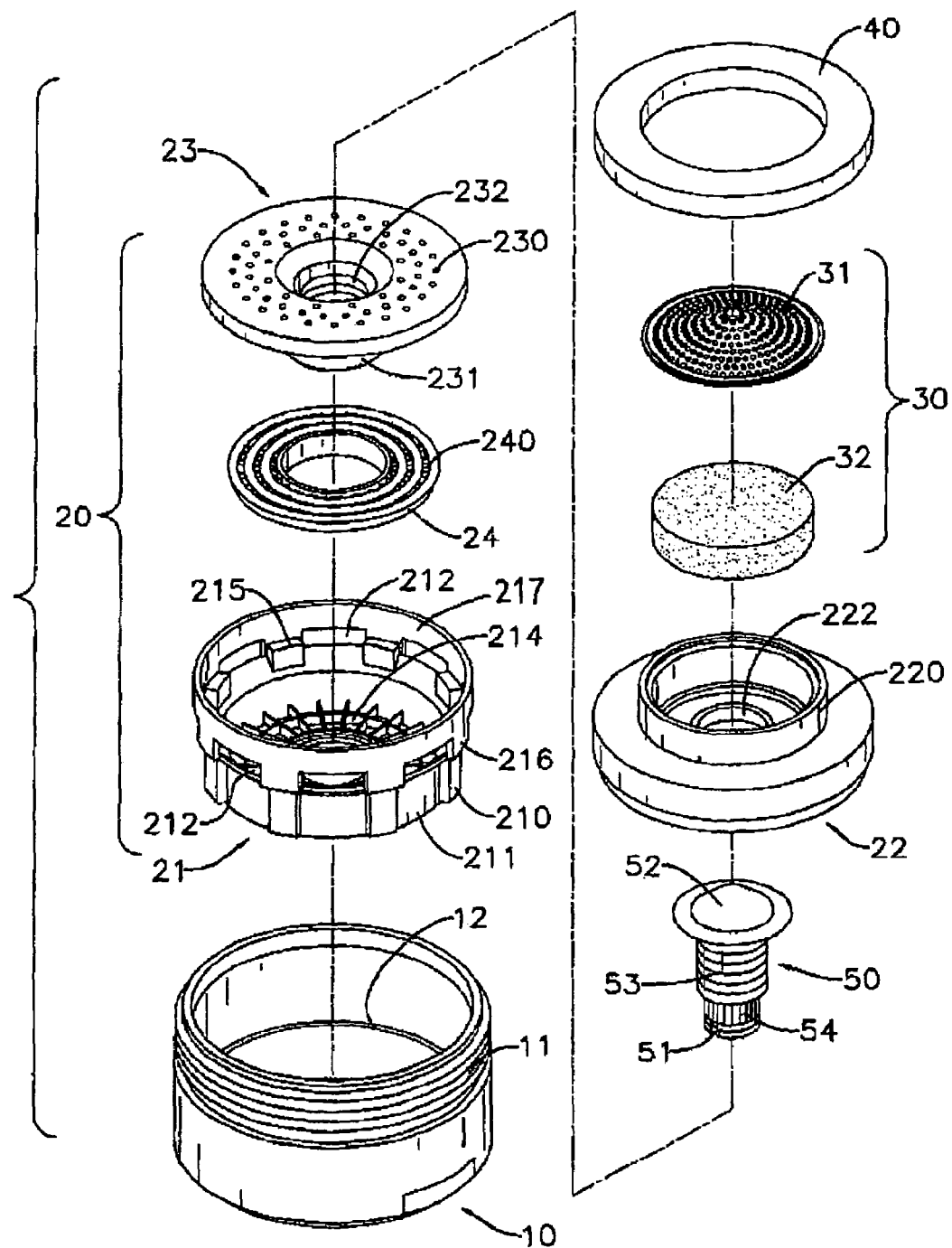
FIG. 2 is an exploded perspective view of the spout in FIG. 1.

With reference to FIGS. 1 and 2, a spout for foaming and saving water in accordance with the present invention is mounted on an outlet of a faucet, foams and saves water flowing out of the faucet and comprises a shell (10), a foaming assembly (20), a sieving assembly (30), a washer (40) and a regulator (50).

Figure 3:
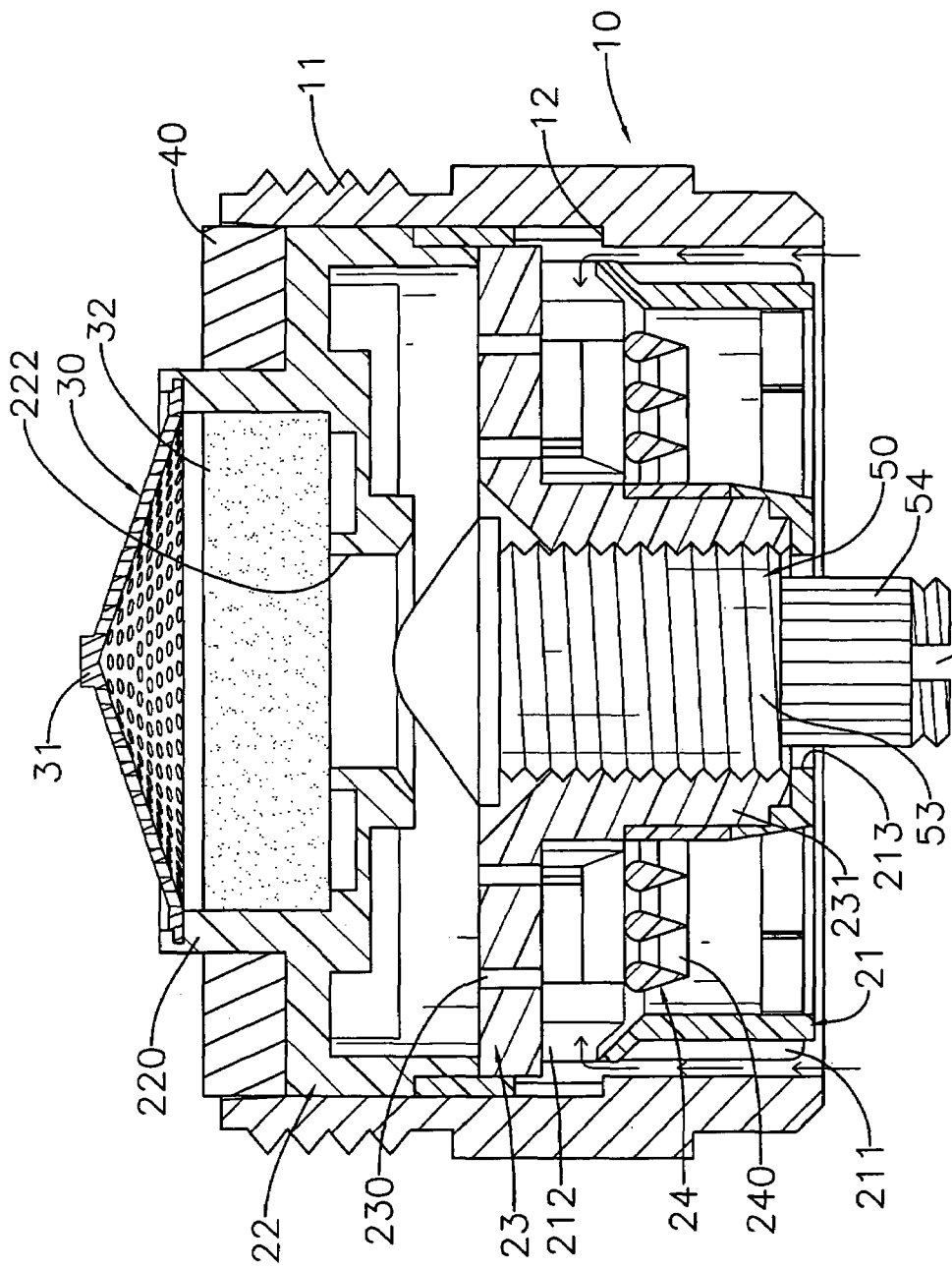
FIG. 3 is a cross-sectional side view of the spout in FIG. 1, shown open.

With further reference to FIG. 3, the shell (10) is attached to the outlet of the faucet and has an outer surface, a faucet end, an inner surface and an outlet end, a thread (11) and a stopper (12). The thread (11) is fastened to the outlet of the faucet and is formed around the outer surface of the shell (10) near the faucet end. The stopper (12) is formed around the inner surface of the shell (12) near the outlet end.

The foaming assembly (20) is mounted in the shell (10), abuts the stopper (12) of the shell (10) and has a sleeve (21), a distributor (23), a foaming ring (24) and an inlet valve (22).

The sleeve (21) is mounted in the shell (10) and has a bottom, an open top, a proximal wall, a distal wall, a through hole (213), multiple water flow holes (214), multiple ribs (210), multiple airways (211), multiple air holes (212) and multiple protrusions (215). The proximal wall is formed longitudinally around the bottom of the sleeve (21) adjacent to the bottom and has a faucet end and an outer surface. The distal wall is larger than, is formed around and protrudes from the faucet end of the proximal wall of the sleeve (21) adjacent to the open top and has an inner surface (217), a faucet end and an abutting surface (216). The abutting surface (216) abuts the stopper (12) of the shell (10). The through hole (213) is formed coaxially through the bottom of the sleeve (21). The water flow holes (214) are formed separately through the bottom and are arranged around the through hole (213) of the sleeve (21). The ribs (210) are formed respectively on and protrude radially from the outer surface of the proximal wall of the sleeve (21). Each airway (211) is formed between each two adjacent ribs (210). The air holes (212) are formed through the distal wall of the sleeve (21) and correspond to the airways (211). The protrusions (215) are formed on and protrude from the inner surface (217) of the distal wall of the sleeve (21) and each protrusion (215) is disposed between two adjacent air holes (212).

The distributor (23) is mounted in the sleeve (21), abuts the protrusions (215) of the sleeve (21) and has a lower surface, a central hole, multiple distributor holes (230) and a connecting tube (231). The central hole is formed coaxially through the distributor (23). The distributor holes (230) are formed separately through the distributor (23) and are arranged around the central hole of the distributor (23). The connecting tube (231) is formed coaxially on and protrudes longitudinally from the lower surface of the distributor (23), communicates with the central hole of the distributor (23) and has an inner surface and an internal thread (232). The internal thread (232) is formed around the inner surface of the connecting tube (231) of the distributor (23).

The foaming ring (24) is mounted between the sleeve (21) and the distributor (23), is securely mounted around the connecting tube (231) of the distributor (23) to allow the air holes (212) of the sleeve (21) to be disposed between the foaming ring (24) and the distributor (23) and has a central hole and multiple foaming holes (240). The central hole is formed coaxially through the foaming ring (24). The foaming holes (240) are formed separately through the foaming ring (24) and around the central hole of the foaming ring (24).

The inlet valve (22) is mounted on the faucet end of the distal wall of the sleeve (21) and in the shell (10) and has an outer surface, a water flow hole (222) and a mounting tube (220). The water flow hole (222) is formed coaxially through the inlet valve (22). The mounting tube (220) is formed on and protrudes from the outer surface of the inlet valve (22), is formed around the water flow hole (222) of the inlet valve (22) and has a faucet end.

The sieving assembly (30) is mounted on the faucet end of the mounting tube (220) of the inlet valve (22) and has a sieve (31) and a filter (32). The sieve (31) is mounted on the faucet end of the mounting tube (220) of the inlet valve (22). The filter (32) is mounted in the mounting tube (220) of the inlet valve (22) and may be active carbon or the like and may eliminate peculiar smells of the water flowing out of the faucet.

The washer (40) is mounted on the outer surface of the inlet valve (22) and around the mounting tube (220) of the inlet valve (22) to seal clearance between the shell (10) and the inlet valve (22).

Figure 4:
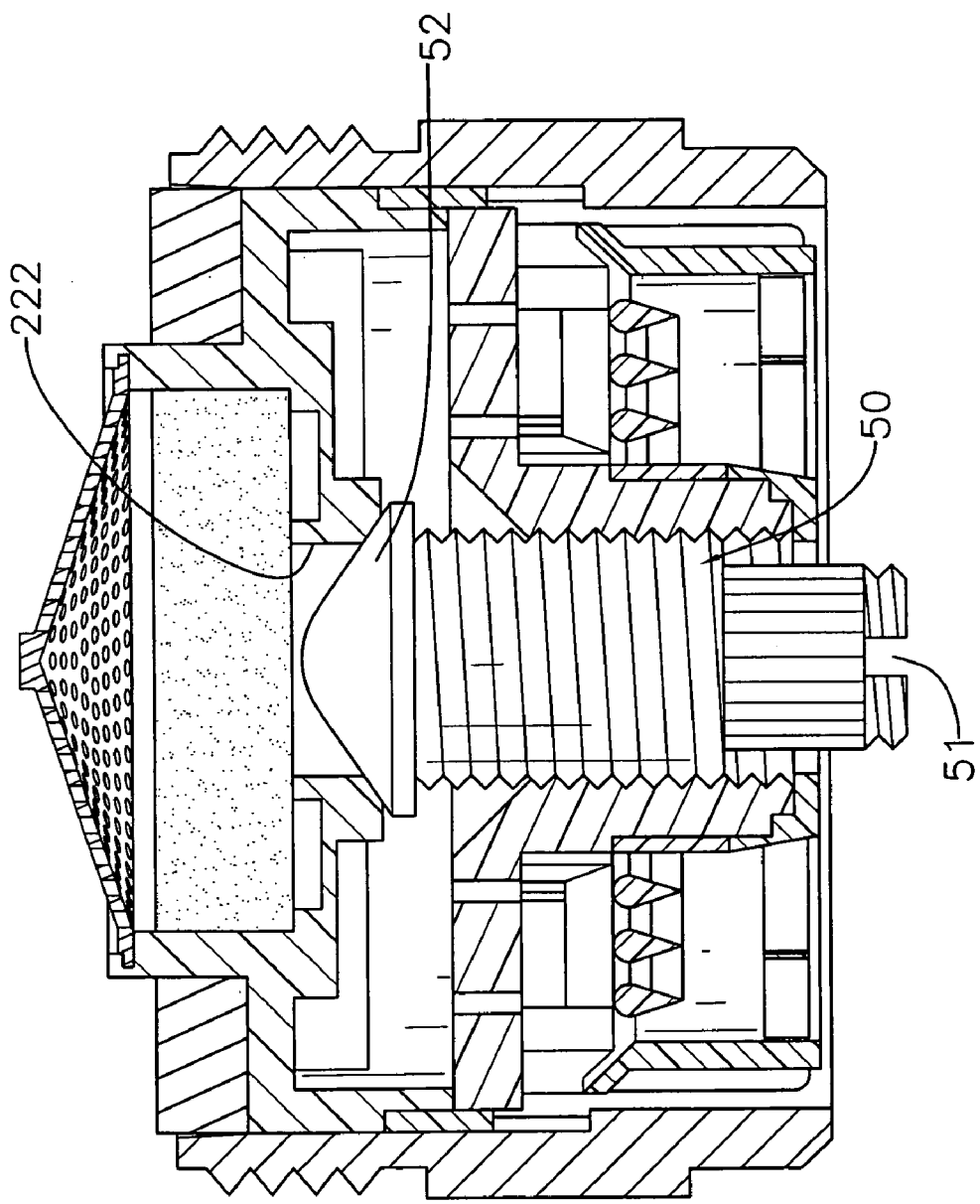
FIG. 4 is a cross-sectional side view of the spout in FIG. 1, shown closed.
Figure 5:
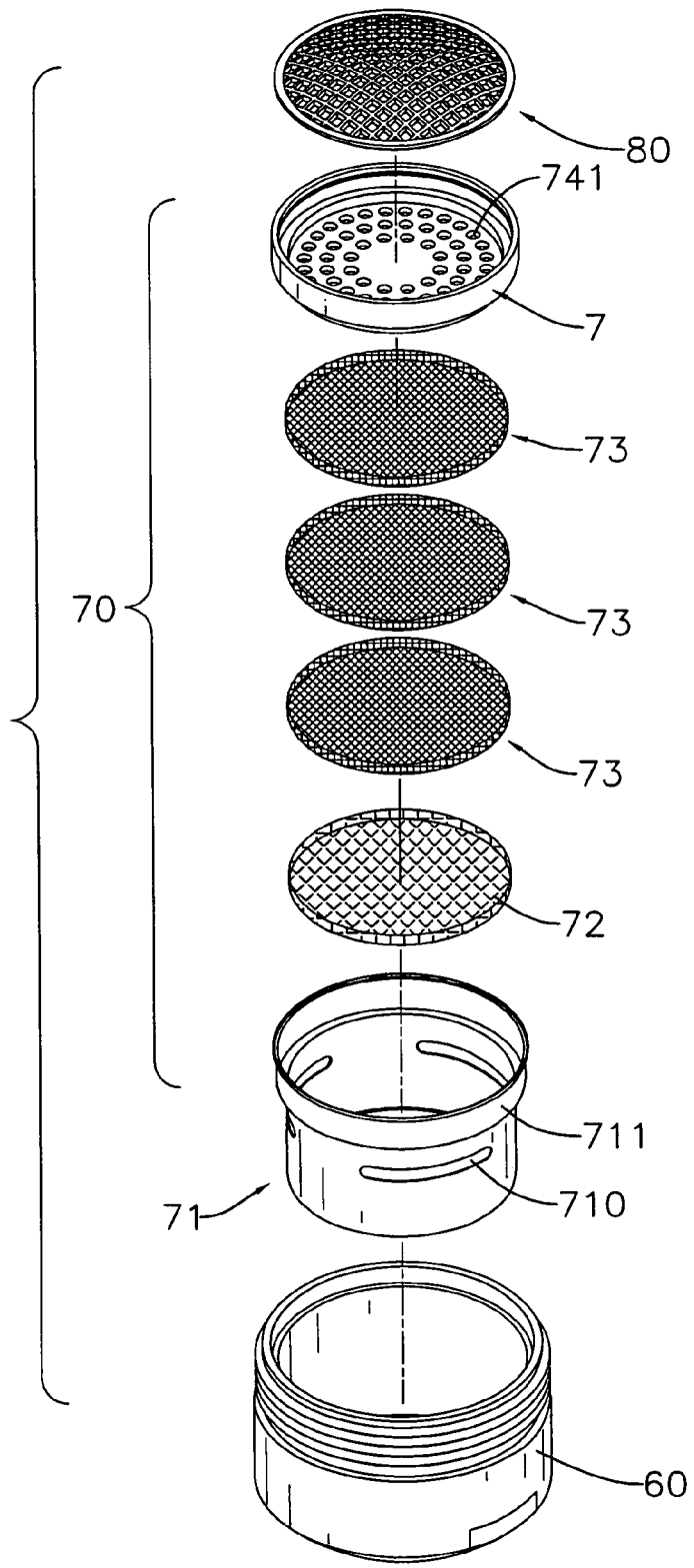
FIG. 5 is an exploded perspective view of a conventional spout in accordance with the prior art.
Figure 6:
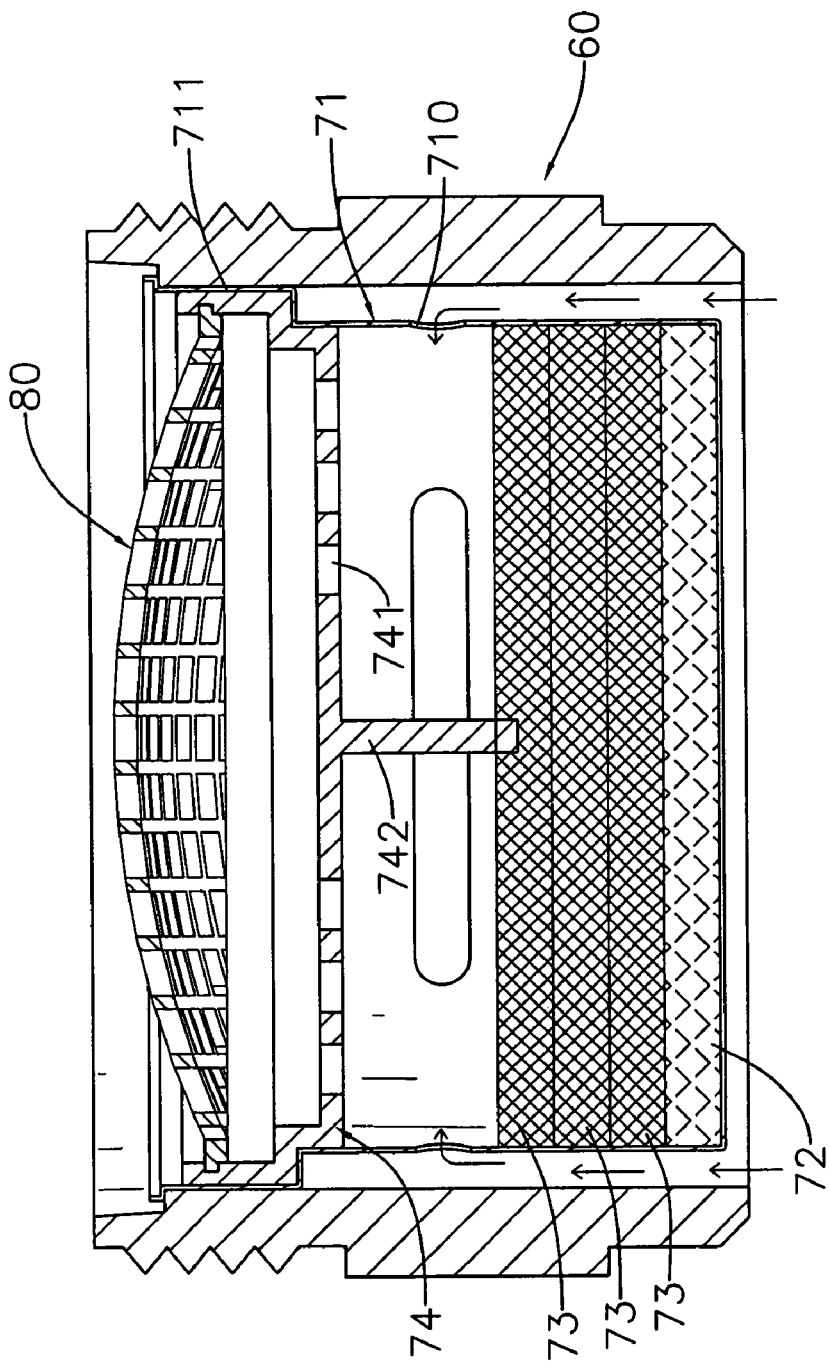
FIG. 6 is a cross-sectional side view of the conventional spout in FIG. 5.

With further reference to FIG. 4, the regulator (50) is mounted through the through hole (213) of the sleeve (21), the central hole of the foaming ring (24) and in central hole and the connecting tube (231) of the distributor (23) and has an outer surface, an inner end, an outer end, a head (52), an external thread (53), a rough surface (54) and a keyed recess (51).

The outer end protrudes out of the outlet end of the shell (10).

The head (52) is formed on the inner end of the regulator (50) and is selectively mounted in the water flow hole (222) of the inlet valve (22).

The external thread (53) is formed around the outer surface of the regulator (50) near the inner end and corresponds to and is fastened onto the internal thread (232) of the distributor (23).

The rough surface (54) is formed around the outer surface of the regulator (50) near the outer end to allow the regulator (50) to be held without tools and rotated.

The keyed recess (51) is formed in the outer end of the regulator (50) to allow the regulator (50) to be rotated with a tool mounted in the keyed recess (51).

When water flows out of the outlet of the faucet, through the sieving assembly (30), the water flow hole (222) of the inlet valve (22), the distributor holes (230) of the distributor (23) and the foaming holes (240) of the foaming ring (24) and out of the water flow holes (214) of the sleeve (21), air outside the shell (10) is sucked into the sleeve (10) through the airways (211) and the air holes (212) of the sleeve (21). The air is mixed with the water and foams.

The spout for foaming and saving water as described has following advantages. The foaming ring (24) and distributor (23) and the sleeve (21) allow the water and the air to fully mix to foam and then flow out of the spout. Impurities in the water will be less jammed in the spout. Furthermore, the regulator (50) may be turned to regulate water flow entering the distributor (22).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A spout for foaming and saving water comprising
   a shell having
      an outer surface;
      an faucet end;
      an inner surface;
      an outlet end; and
      a stopper being formed around the inner surface of the shell near the outlet end;
   a foaming assembly being mounted in the shell, abutting the stopper of the shell and having
      a sleeve being mounted in the shell and having
         a bottom;
         an open top;
         a proximal wall being formed longitudinally around the bottom of the sleeve adjacent to the bottom and having
            a faucet end; and
            an outer surface;
         a distal wall being larger than, being formed around and protruding from the faucet end of the proximal wall of the sleeve adjacent to the open top and having an inner surface;
a faucet end; and
an abutting surface abutting the stopper of the shell;
a through hole being formed coaxially through the bottom of the sleeve;
multiple water flow holes being formed separately through the bottom and being arranged around the through hole of the sleeve; and
multiple air holes being formed through the distal wall of the sleeve;
a distributor being mounted in the sleeve and having
a lower surface;
a central hole being formed coaxially through the distributor; and
multiple distributor holes being formed separately through the distributor and being arranged around the central hole of the distributor;
a foaming ring being mounted between the sleeve and the distributor and having
a central hole being formed coaxially through the foaming ring; and
multiple foaming holes formed separately through the foaming ring and around the central hole of the foaming ring; and
an inlet valve being mounted on the faucet end of the distal wall of the sleeve and in the shell and having
an outer surface; and
a water flow hole being formed coaxially through the inlet valve; and
a regulator being mounted through the through hole of the sleeve and the central holes of the foaming ring and distributor and having
an outer surface;
an inner end;
an outer end protruding out of the outlet end of the shell; and
a head being formed on the inner end of the regulator and being selectively mounted in the water flow hole of the inlet valve.

2. The spout as claimed in claim 1, wherein
the distributor further has a connecting tube being formed coaxially on and protruding longitudinally from the lower surface of the distributor, communicating with the central hole of the distributor and having
an inner surface; and
an internal thread being formed around the inner surface of the connecting tube of the distributor;
the foaming ring is securely mounted around the connecting tube of the distributor; and
the regulator is mounted in the connecting tube of the distributor and further has
an external thread being formed around the outer surface of the regulator near the inner end and corresponding to and being fastened onto the internal thread of the distributor, and
a keyed recess being formed in the outer end of the regulator.

3. The spout as claimed in claim 2, wherein the regulator further has a rough surface being formed around the outer surface of the regulator near the outer end.

4. The spout as claimed in claim 1, wherein
the sleeve of the foaming assembly further has multiple protrusions being formed on and protruding from the inner surface of the distal wall of the sleeve and each protrusion being disposed between two adjacent air holes; and
the distributor abuts the protrusions of the sleeve.

5. The spout as claimed in claim 2, wherein
the sleeve of the foaming assembly further has multiple protrusions being formed on and protruding from the inner surface of the distal wall of the sleeve and each protrusion being disposed between two adjacent air holes; and
the distributor abuts the protrusions of the sleeve.

6. The spout as claimed in claim 3, wherein
the sleeve of the foaming assembly further has multiple protrusions being formed on and protruding from the inner surface of the distal wall of the sleeve and each protrusion being disposed between two adjacent air holes; and
the distributor abuts the protrusions of the sleeve.

7. The spout as claimed in claim 1, wherein
the inlet valve further has a mounting tube being formed on and protruding from the outer surface of the inlet valve, being formed around the water flow hole of the inlet valve and having a faucet end; and
the spout further comprises a sieving assembly being mounted on the faucet end of the mounting tube of the inlet valve and having a sieve being mounted on the faucet end of the mounting tube of the inlet valve.

8. The spout as claimed in claim 2, wherein
the inlet valve further has a mounting tube being formed on and protruding from the outer surface of the inlet valve, being formed around the water flow hole of the inlet valve and having a faucet end; and
the spout further comprises a sieving assembly being mounted on the faucet end of the mounting tube of the inlet valve and having a sieve being mounted on the faucet end of the mounting tube of the inlet valve.

9. The spout as claimed in claim 3, wherein
the inlet valve further has a mounting tube being formed on and protruding from the outer surface of the inlet valve, being formed around the water flow hole of the inlet valve and having a faucet end; and
the spout further comprises a sieving assembly being mounted on the faucet end of the mounting tube of the inlet valve and having a sieve being mounted on the faucet end of the mounting tube of the inlet valve.

10. The spout as claimed in claim 4, wherein
the inlet valve further has a mounting tube being formed on and protruding from the outer surface of the inlet valve, being formed around the water flow hole of the inlet valve and having a faucet end; and
the spout further comprises a sieving assembly being mounted on the faucet end of the mounting tube of the inlet valve and having a sieve being mounted on the faucet end of the mounting tube of the inlet valve.

11. The spout as claimed in claim 5, wherein
the inlet valve further has a mounting rube being formed on and protruding from the outer surface of the inlet valve, being formed around the water flow hole of the inlet valve and having a faucet end; and
the spout further comprises a sieving assembly being mounted on the faucet end of the mounting tube of the inlet valve and having a sieve being mounted on the faucet end of the mounting tube of the inlet valve.

12. The spout as claimed in claim 6, wherein
the inlet valve further has a mounting tube being formed on and protruding from the outer surface of the inlet valve, being formed around the water flow hole of the inlet valve and having a faucet end; and
the spout further comprises a sieving assembly being mounted on the faucet end of the mounting tube of the inlet valve and having a sieve being mounted on the faucet end of the mounting tube of the inlet valve.

13. The spout as claimed in claim 7, wherein the sieving assembly further has a filter being mounted in the mounting tube of the inlet valve; and the spout further has a washer being mounted on the outer surface of the inlet valve and around the mounting tube of the inlet valve.

14. The spout as claimed in claim 8, wherein the sieving assembly further has a filter being mounted in the mounting tube of the inlet valve; and the spout further has a washer being mounted on the outer surface of the inlet valve and around the mounting tube of the inlet valve.

15. The spout as claimed in claim 9, wherein the sieving assembly further has a filter being mounted in the mounting tube of the inlet valve; and the spout further has a washer being mounted on the outer surface of the inlet valve and around the mounting tube of the inlet valve.

16. The spout as claimed in claim 10, wherein the sieving assembly further has a filter being mounted in the mounting tube of the inlet valve; and the spout further has a washer being mounted on the outer surface of the inlet valve and around the mounting tube of the inlet valve.

17. The spout as claimed in claim 11, wherein the sieving assembly further has a filter being mounted in the mounting tube of the inlet valve; and the spout further has a washer being mounted on the outer surface of the inlet valve and around the mounting tube of the inlet valve.

18. The spout as claimed in claim 12, wherein the sieving assembly further has a filter being mounted in the mounting tube of the inlet valve; and the spout further has a washer being mounted on the outer surface of the inlet valve and around the mounting tube of the inlet valve.

19. The spout as claimed in claim 1, wherein the sleeve of the foaming assembly further has multiple ribs being formed respectively on and protruding radially from the outer surface of the proximal wall of the sleeve; and multiple airways being formed between each two adjacent ribs.

20. The spout as claimed in claim 1, wherein the shell further has a thread being formed around the outer surface of the shell near the faucet end.

* * * * *